Patented June 27, 1933

1,915,393

UNITED STATES PATENT OFFICE

FOORD von BICHOWSKY, OF GLENDALE, CALIFORNIA

METHOD FOR PRODUCING TITANIUM SULPHATES

No Drawing.   Application filed March 19, 1932.   Serial No. 600,074.

This invention relates to the production of soluble titanium sulphates (quadrivalent) from insoluble hydrated oxygen containing titanium compounds, other than titanates, and will be fully understood from the following description thereof.

I am aware that it has been proposed, U. S. Patent No. 1,559,113, to manufacture soluble titanic sulphate by acting upon moist basic titanium sulphate with concentrated sulphuric acid and adding thereto fuming sulphuric acid. It is further stated that when concentrated sulphuric acid is used alone that a long continued heating, from 24 to 48 hours, is required.

Because the use of fuming sulphuric acid containing from 5% to 20% excess $SO_3$ is somewhat dangerous I began a study of the sulphating reaction. My experiments covered the use of commercial sulphuric acid of 66° Baumé and weaker.

I discovered that if I added slowly, so as to avoid local overheating, strong (60° to 66° Baumé) sulphuric acid to a filter cake containing, for example, approximately 50% of mechanically held and chemically combined water and about 46% of titanium dioxide and about 4% of combined sulphuric acid and stirred the cake vigorously, in order to break up any lumps and also to keep the temperature of the mixture from rising too rapidly and to too high a point, that I obtained a suspension of the apparently unchanged titanium oxygen containing material in a comparatively weak sulphuric acid.

I further discovered that if I slowly warmed this paste during a period of say six hours and kept it stirred and at all times kept it below the boiling point that I could thus obtain a clear syrupy mass of titanium sulphate or sulphates that was readily soluble in water.

The amount of sulphuric acid required, as calculated from the analysis of the titanium oxygen containing material employed, was often slightly in excess of that needed to form the normal sulphate of quadrivalent titanium.

I do not wish to limit myself, however, to the above example, for in carrying out my invention one may use the amount of sulphuric acid required to form either the normal sulphate or the acid sulphate or mixtures of the two in any desired proportion.

One may employ as a starting material, beside the one mentioned, other moist titanium oxygen containing materials such as pure or impure meta-titanic acid or the various basic titanic sulphates or mixtures thereof preferably in the form of a moist filter cake.

One may also carry out the sulphating reaction under diminished pressure.

Now having described my invention what I claim is:

Method for producing titanium sulphates from hydrated titanic oxide containing material, titanates excluded, which consists in adding thereto strong sulphuric acid, whereby said acid is diluted, while keeping the temperature of the mixture so low that local overheating is avoided and then slowly heating the mixture so as to cause the sulphating reaction to proceed at temperatures below the normal boiling point of the liquids as present.

FOORD von BICHOWSKY.